United States Patent
Abdi et al.

(10) Patent No.: US 10,219,238 B2
(45) Date of Patent: Feb. 26, 2019

(54) OTDOA IN LTE NETWORKS

(71) Applicant: Sequans Communications S.A., Colombes (FR)

(72) Inventors: Moussa Abdi, Colombes (FR); Serdar Sezginer, Colombes (FR); Alain Kouioumdjian, Colombes (FR); Imran Latif, Colombes (FR); Aymane Hamahmy, Colombes (FR); Bertrand Muquet, Colombes (FR)

(73) Assignee: Sequans Communications S.A., Colombes (FR)

( * ) Notice: Subject to any disclaimer, the term of this patent is extended or adjusted under 35 U.S.C. 154(b) by 15 days.

(21) Appl. No.: 15/136,394

(22) Filed: Apr. 22, 2016

(65) Prior Publication Data

US 2016/0316445 A1    Oct. 27, 2016

(30) Foreign Application Priority Data

Apr. 24, 2015  (EP) .................................... 15305638

(51) Int. Cl.
*H04L 27/26* (2006.01)
*H04W 56/00* (2009.01)
(Continued)

(52) U.S. Cl.
CPC ....... *H04W 56/0065* (2013.01); *H04L 5/0048* (2013.01); *H04L 27/2601* (2013.01);
(Continued)

(58) Field of Classification Search
None
See application file for complete search history.

(56) References Cited

U.S. PATENT DOCUMENTS 10,034,191 B2    7/2018  Van Minh et al.
2007/0058738 A1*  3/2007  Mahadevappa ........ H04B 1/715
                                                    375/260
(Continued)

FOREIGN PATENT DOCUMENTS

EP          2 833 563 A2    2/2015
WO     WO 2011/160697      12/2011

OTHER PUBLICATIONS

European Search Report for European Patent Application No. 15305638.7, "OTDOA in LTE Networks", dated Oct. 20, 2015.
(Continued)

*Primary Examiner* — Xavier Szewai Wong
(74) *Attorney, Agent, or Firm* — Hamilton, Brook, Smith & Reynolds, P.C.

(57) ABSTRACT

A computer implemented method for providing OTDOA timing information comprising defining an FFT window pair for estimating a value of reference signal time difference "RSTD" for at least one base station and a reference cell, receiving a PRS from the at least one base station and the reference cell, executing an FFT per OFDM symbol of the PRS for each FFT window of the FFT window pair, obtaining a first FFT output vector per OFDM symbol of each FFT window, for each first output vector, descrambling tones corresponding to the known position of the PRS, wherein all other tones are set to zero, combining vectors based on respective first FFT output vectors, executing an iFFT to convert to the time domain; and calculating an estimated value of reference signal time difference "RSTD" for the at least one base station and the reference cell.

15 Claims, 3 Drawing Sheets

(51) Int. Cl.
*H04W 24/10* (2009.01)
*H04L 5/00* (2006.01)

(52) U.S. Cl.
CPC ...... *H04L 27/2665* (2013.01); *H04L 27/2672* (2013.01); *H04L 27/2675* (2013.01); *H04W 24/10* (2013.01); *H04W 56/0015* (2013.01)

(56) References Cited

U.S. PATENT DOCUMENTS

| | | | | |
|---|---|---|---|---|
| 2007/0076589 | A1* | 4/2007 | Stopler | H04L 5/0016 370/210 |
| 2009/0303981 | A1* | 12/2009 | Massam | H04J 3/0605 370/350 |
| 2012/0020437 | A1* | 1/2012 | Furudate | H04L 25/0204 375/316 |
| 2013/0315320 | A1* | 11/2013 | McGowan | H04L 27/2614 375/260 |
| 2013/0336133 | A1* | 12/2013 | Carbonelli | H04L 25/0232 370/252 |
| 2015/0018010 | A1* | 1/2015 | Fischer | H04W 4/023 455/456.2 |
| 2015/0215884 | A1* | 7/2015 | Horvat | G01S 5/0294 370/328 |
| 2016/0192398 | A1* | 6/2016 | Wang | H04W 74/0833 370/329 |
| 2016/0381592 | A1 | 12/2016 | Nguyen et al. | |

OTHER PUBLICATIONS

Liu, J. and Feng, S., "Enhanced RSTD for Scalable Bandwidth of OTDOA Positioning in 3GPPLTE", 2013 International Conference on Localization and GNSS, IEEE, 5 pages, Jun. 25, 2013.
Qualcomm Incorporated, "Updated OTDOA Link-Level Results for Synchronous Case", $3^{rd}$ Generation Partnership Project TSG-RAN WG4 #54, San Francisco, California , Feb. 22, 2010; 8 pages.
Sourour, E. A., "Frequency Domain Synchronization and Cell Search in 3GPP LTE Systems", 2015 International Conference on Computing, Networking and Communications (ICNC), Feb. 16, 2015, pp. 341-345.

\* cited by examiner

OTDOA IN LTE NETWORKS

RELATED APPLICATION

This application claims priority under 35 U.S.C. § 119 or 365 to European Application No. 15305638.7, filed Apr. 24, 2015. The entire teachings of the above application are incorporated herein by reference.

TECHNICAL FIELD

This invention relates to Observed Time-Different of Arrival (OTDOA) in LTE networks. It is particularly suitable for, but by no means limited to, a lower complexity frequency domain implementation of OTDOA in LTE networks.

BACKGROUND

In order to support the OTDOA feature, all eNodeBs (E-UTRAN Node Bs as would be understood by the skilled person) transmit Positioning Reference Signals (PRS) on a pre-defined time-frequency pattern. Whenever needed, the user equipment (UE) can receive a request to report the Reference Signal Time Difference (RSTD) for a set of eNodeBs, which corresponds to the time difference between the reception of the PRS sent by the measured eNodeB and the reception of the PRS sent from a reference cell (typically the serving cell). OTDOA requires the UE to measure the RSTD of up to 16 eNodeBs (for 3GPP Release 9) in order to be able to output a reliable measure of OTDOA.

To ease the detection, a location server in the network transmits OTDOA assistance data to the UE as specified by the LTE Positioning Protocol (LPP). This assistance data permits the UE to obtain a priori information on the range of RSTD to be estimated (a search window is provided and the UE detects the PRS on this window). An Expected RSTD parameter is provided to the UE together with the RSTD Uncertainty which indicates the uncertainty in the Expected RSTD value. The UE may then determine a search window over which the effective RSTD will be estimated, which will be a window of twice the Uncertainty value centered on the Expected RSTD value (see FIG. 4).

The search window may cover a significant portion of time and is not restricted to a duration of less than the cyclic prefix (CP). The most commonly used method to estimate the RSTD is a time-domain correlation of incoming signals with the time domain signal sent by the measured eNodeB (that can be computed based on the known time-frequency PRS pattern) to obtain the power profile of the propagation channel in question. Then, a peak detection algorithm is executed to estimate the first peak location.

If the search window size is less than or equal to CP length, an equivalent frequency-domain implementation using FFT, point by point multiplication with pilot sequence, and iFFT can be used. This approach is used in "Qualcomm Incorporated, 3GPP contribution R4-100739, Updated OTDOA link-level results for synchronous case, San Francisco, USA: 3GPP TSG-RAN WG4." where the following is disclosed "In the receiver, the PRS pilot tones corresponding to each base station (BS) are extracted and correlation is carried out in the frequency domain. By taking the IFFT of the correlation sequence the channel impulse response is obtained." However, this is not valid for higher timing ranges, which may be present since it is desired to measure delays corresponding to non-serving eNodeBs. Among the non-serving eNodeBs, one or more may be sufficiently far from the serving eNodeB to produce an RSTD significantly higher than the cyclic prefix (the latter being dimensioned to absorb not more than the delay spread of propagation channel between UE and serving eNodeB). In such a case, the RSTD uncertainty provided by the location server is not guaranteed to be smaller than the cyclic prefix. Notice also that the maximum authorized value for the RSTD uncertainty (as per the LPP part of LTE standards) is much higher than the cyclic prefix. Therefore, there is no way to choose an FFT window ensuring that the delay between the start of the window and the start of the received reference signal of the eNodeB to measure is lower than the cyclic prefix, as would be required for an optimal frequency domain processing using known techniques.

Therefore, currently, the only method that always works is the time-domain correlation, which is much more complex than an implementation in the frequency domain.

Accordingly, it is desired to derive a frequency-domain implementation of OTDOA in LTE networks that provides a less complex and hence more resource efficient solution.

SUMMARY

According to a first aspect there is provided a method for providing OTDOA timing information as defined in Claim 1 of the appended claims. Thus there is provided a computer implemented method for providing OTDOA timing information comprising: defining an FFT window pair for estimating a value of reference signal time difference "RSTD" for at least one base station and a reference cell; receiving a PRS from the at least one base station and the reference cell; executing an FFT per OFDM symbol of the PRS for each FFT window of the FFT window pair; obtaining a first FFT output vector per OFDM symbol of each FFT window; for each first output vector, descrambling tones corresponding to the known position of the PRS, wherein all other tones are set to zero; combining vectors based on respective first FFT output vectors; executing an iFFT to convert to the time domain; and calculating an estimated value of reference signal time difference "RSTD" for the at least one base station and the reference cell.

Optionally, the method further comprising time domain accumulation or interpolation carried out per FFT window based on the first FFT output vectors to obtain a second output vector per FFT window; and wherein the combining is coherent combining carried out between the two second vectors to obtain an iFFT input; and executing the iFFT on the input.

Optionally, the method further wherein the combining is coherent combining carried out between the first FFT output vector of each OFDM symbol of each FFT window to obtain a combined vector per OFDM symbol; and wherein time domain accumulation or interpolation is carried out over the combined vectors to obtain an iFFT input; and executing the iFFT on the input.

Optionally, the method further comprising time domain accumulation or interpolation carried out per FFT window based on the first FFT output vectors to obtain a second output vector per FFT window; executing the iFFT on each second output vector to obtain respective power delay profiles; and wherein the combining is non-coherent combining carried out on the power delay profiles.

Optionally, the method wherein defining an FFT window pair comprises arranging the FFT window pair based on pre-defined search window information from at least one of the at least one base station and the reference cell.

Optionally, the method wherein a plurality of FFT window pairs are used if a single pair of FFT windows with the first FFT window spanning the search windows from the at least one base station and the reference cell to be measured cannot be found.

Optionally, the method wherein the method is executed in parallel on FFT window pairs.

Optionally, the method wherein the first FFT window of the FFT window pair is positioned such that it begins at the start of an earliest search window of the at least one base station or reference cell.

Optionally, the method wherein an FFT window pair is defined for each of the reference cell and the at least one base station Optionally, the method wherein the windows of an FFT window pair overlap Optionally, the method wherein the windows of an FFT window pair are separated; and optionally, wherein the separation is by the length of the cyclic prefix.

Optionally, the method wherein, together, the search windows of the at least one base station and the reference cell span a maximum of one OFDM symbol.

Optionally, the method wherein the combining is coherent combining.

Optionally, the method wherein the combining is weighted gain combining.

Optionally, the method wherein the combining is equal-gain combining.

Optionally, the method wherein the combining is maximum ratio combining.

Optionally, the method wherein the power delay profile is obtained by coherent accumulation of correlation by summing or interpolating contributions of different OFDM symbols.

Optionally, the method wherein the combining is carried out in the frequency domain.

Optionally, the method further comprising executing a time domain implementation on a subsequent iteration of the method based on the SNR of the power delay profile of the at least one base station and the reference cell.

Optionally, the method further comprising carrying out averaging on a subsequent iteration of the method based on a subsequent reception of PRS from the at least one base station and the reference cell to obtain averaging gain.

According to a second aspect there is provided a system comprising a processor arranged to carry out any of the methods as disclosed herein.

According to a third aspect there is provided a computer readable medium comprising instructions that when executed by a processor cause the processor to carry out any of the disclosed methods.

With all the aspects, preferable and optional features are defined in the dependent claims.

BRIEF DESCRIPTION OF THE DRAWINGS

Embodiments will now be described, by way of example only, and with reference to the drawings in which.

In the figures, like elements are indicated by like reference numerals throughout.

OVERVIEW

The problem addressed is how to support the OTDOA feature with an implementation that has low complexity with a small performance degradation compared to the optimal method. OTDOA is a key feature for localization that has been standardized in 3GPP release 9, and will be deployed in most operators' networks in the next few years. A reduced complexity method is described with an implementation in the frequency domain.

In overview, the concepts behind this disclosure are the following:

Use frequency-domain processing over two FFT windows and combine the signals to cover timing ranges beyond the CP. Combination can be done in the power domain (i.e., time domain), and preferably using coherent (in-phase) combination. In this disclosure, only the coherent combination is described. Coherent combining can be realized using different methods, for example, equal-gain combining (see section "Coherent combining across FFT windows"), maximum ratio combining (MRC), i.e. different weighted combinations (see sections "weighted gain combining") can be used.

Figure 5:
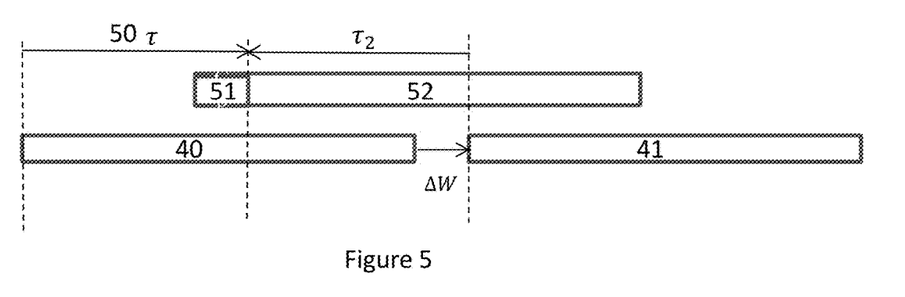
FIG. 5 illustrates the relationship between 1st and 2nd FFT windows when a search window bridges the FFT windows.

As shown in FIG. 5, a time domain window of size $\Delta W$ can be inserted between the two FFT windows. Any delay may be used provided it is much smaller than the FFT window. Typically, this delay $\Delta W$ could be equal to CP length if we reuse the same hardware as that used for physical downlink shard channel (PDSCH) processing, or preferably equal to zero to avoid losing any useful signal. This delay should be taken into account when doing any kind of combining.

Figure 3:
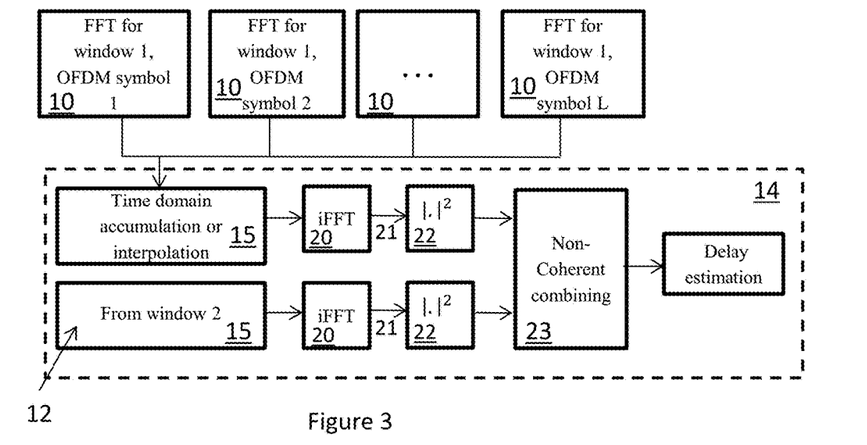
FIG. 3 illustrates an embodiment where time-domain combining is carried out in the power domain.

Time domain combination (non-coherent or power domain combining) can be used (see FIG. 3 for an embodiment of such a method). In this embodiment, prior to combination, a circular shift of $\Delta W$ samples of the time domain signal of the second window should be applied to compensate for the time domain delay $\Delta W$ between FFT windows before combination (where $\Delta W$ is defined in FIG. 5).

Use a single pair of FFT windows to estimate the timings of multiple eNodeBs. Only the pilot compensation and iFFT will be done on a per eNodeB basis. This algorithm structure is suited for search windows spanning at maximum one OFDM symbol, i.e. for an RSTD uncertainty lower than or equal to one OFDM symbol. This is equivalent to approximately 20 km, which is sufficiently large to cater for many typical network layout situations (more than the typical distance between two adjacent cell sites depending on the operator network in question).

Further averaging across PRS occasions can be carried out in order to have further averaging gain. This averaging may be done in the power domain, or can be done on the measured timings. This is not described herein, and may be achieved by tuning the trade-off between the averaging gain and the coherence time of the RSTD (that directly depends on the UE motion).

Multiple instances of the algorithm can be run in parallel with different FFT windows (for example for search windows of different cells covering a large area)

The methodology may be implemented using two FFT windows separated by the length of the CP because it corresponds to classical processing (for example the default behaviour of hardware programmed to process LTE) but any relative timing of FFT windows can be used, including overlapping windows.

Each PRS occasion comprises multiple OFDM symbols. The processing of a single OFDM symbol is discussed herein for simplicity. Coherent accumulation of correlation (time or frequency domain, by summing or interpolating the contributions of the different OFDM symbols) can be used before power computation to obtain the power delay profile (PDP). This processing step is not described herein as this is common to any method of combining. It is noted that any interpolation/accumulation method can be considered to collect the signal of the different OFDM symbols.

The content of the FFT windows depends on the actual processing chosen to combine the OFDM symbols of a single LTE sub-frame inside a PRS occasion. Time domain accumulation of different OFDM symbols can be first performed, and can be considered as the input to the FFT windows. One FFT window pair per OFDM symbol can be used, and the accumulation can be carried out after combination. The methodology described herein is generic and does not consider a specific time domain processing, assuming the FFT windows inputs (input vector(s)) correspond to the chosen implementation.

DETAILED DESCRIPTION

Figure 1:
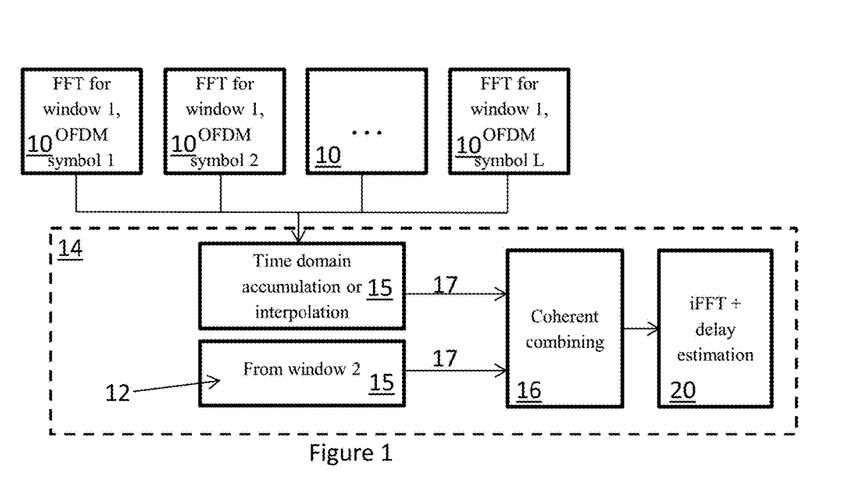
FIG. 1 illustrates an embodiment where coherent combining is carried out post-accumulation.
Figure 2:
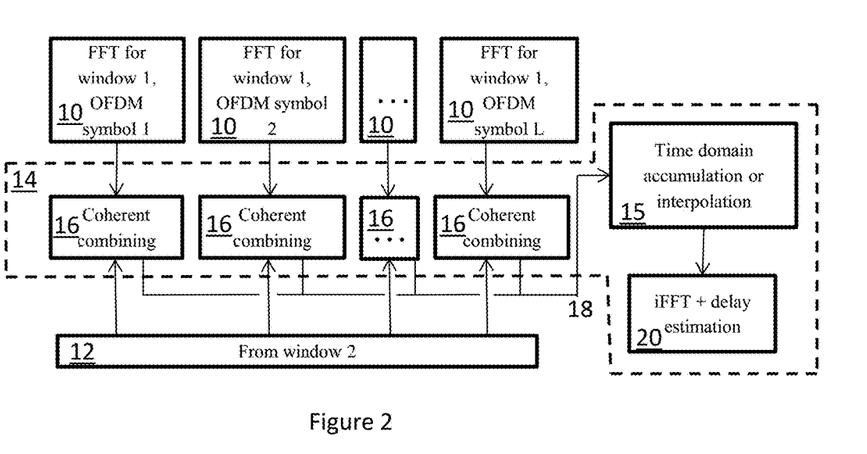
FIG. 2 illustrates an embodiment where coherent combining is carried out on each OFDM symbol.

Three possible embodiments are illustrated in FIGS. 1 to 3 and are further detailed here. For each embodiment, the first stage of the processing is the same and comprises carrying out one FFT per OFDM symbol for each FFT window (10). In each of FIGS. 1, 2 and 3, 'from window 2' (12) represents the second window and comprises a set of FFTs for window 2 in the same manner as shown by feature 10. This results in two FFT output vectors per OFDM symbol. In FIGS. 1 and 3, 'from window 2' (12) also comprises time domain accumulation or interpolation 15 as described below.

For each output vector, we descramble the tones corresponding to the known position of the PRS and put all other tones to zero. Non-coherent or coherent combining of the two output vectors per OFDM symbol can then be performed according to the embodiments of FIG. 1, 2 or 3 as shown in the highlighted sections 14. Each embodiment contains an iFFT (20) that is used to convert the frequency domain signal to a time domain signal. The size of this FFT can be adapted to the resolution desired in the final delay estimation (the OTDOA of the eNodeB to be measured), and is the same for the three embodiments of FIGS. 1, 2 and 3.

FIG. 1 shows an embodiment where coherent combining (16) is carried out post-accumulation (15). In this embodiment, time domain accumulation or interpolation (15) is performed on a per FFT window basis. Two vectors (17, one per FFT window) are obtained. Coherent combining (16) is carried out between these two vectors and the result feeds the final iFFT (20).

FIG. 2 shows an embodiment where coherent combining (16) is carried out on each OFDM symbol. In this embodiment, coherent combining is carried out on each OFDM symbol to end up with one combined vector (18) per OFDM symbol. Then time domain accumulation or interpolation (15) is carried out over OFDM symbols to feed the final iFFT (20).

FIG. 3 shows an embodiment where time-domain non-coherent combining (23) is carried out in the power domain. In this embodiment, a time domain accumulation or interpolation (15) is carried out on a per FFT window basis to obtain two vectors (one per FFT window) in the same manner as the embodiment of FIG. 1. Two iFFT (20) are used to obtain two power delay profiles (21). These two profiles are accumulated (22) in the power domain after an optional circular shift applied to the iFFT buffer of second FFT window (12) to compensate for the $\Delta W$ delay if any. The reason for this shift is explained by looking at FIG. 5. The delays $\tau$ and $\tau_2$ measured with respect to the first and second FFT window starts verify $\tau_2 = NT_s + \Delta W - \tau$ where N=2048 and Ts is the basic time unit of LTE standards. Due to wrapping, only modulo N window length can be measured, so that the measured timing on second OFDM symbol is $\hat{\tau}_2 = \Delta W - \tau$. To obtain the same measure of the delays $\tau$ on both windows, a circular shift of the second FFT window is performed by an amount of $\Delta W$.

Front-End FFT and Pilot Compensation (10)

Figure 4:
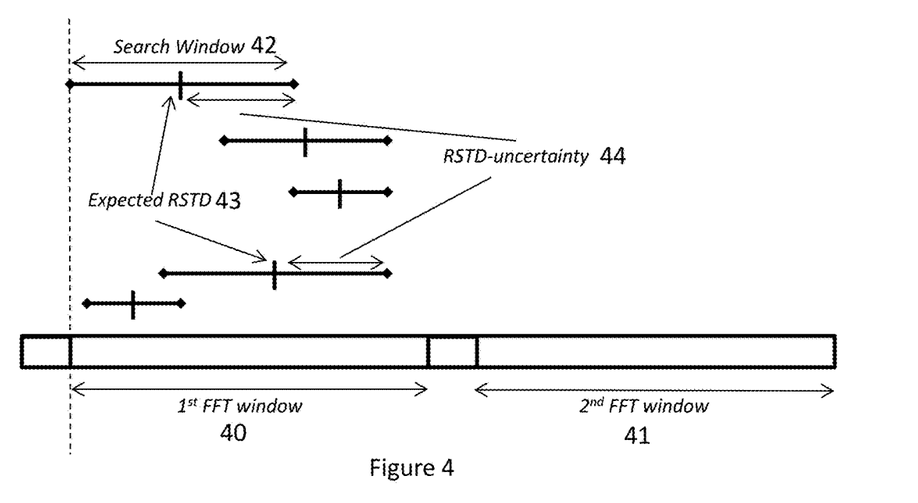
FIG. 4 illustrates search windows of various eNodeB's in relation to 1st and 2nd FFT windows of embodiments.

As will be understood, when the location server requires a UE to provide RSTD measurement for a given eNodeB, the UE restricts its peak search to a known predefined search window (as described in the background section). FIG. 4 shows such search windows 42 for a set of cell sites that are visible to a particular UE at a particular moment in time. Each search window 42 is with reference to a particular cell site (eNodeB).

Preferably, a set of mobile network cell sites are selected such that the search windows that are derived by a UE are contained by the first OFDM symbol. The earliest and latest possible delays derived from the Expected RSTD 43 and RSTD uncertainty 44 (received from the location server for each cell site) may be interrogated to confirm that a particular cell meets the criteria.

As described in the overview section, two FFT windows 40, 41 are defined such that, preferably, the signals received from all cells under consideration (comprising each search window) are captured inside both FFT windows (except the part located between the FFT windows if we choose $\Delta W > 0$). If a signal received from a given cell is captured inside both FFT windows this is equivalent to imposing that the delay of that cell is at maximum one FFT window.

In the case where the range of all search windows spans more than one FFT window, a plurality of pairs of FFT windows may be used. This disclosure describes a single pair of FFT windows but can be used the same way for all pairs. When multiple pairs are used, the identities of the measured eNodeBs in question change, but otherwise, the technique is the same as for a single pair of FFT windows.

The timing of the FFT window (40) is selected so that it preferably starts at the beginning of the earliest search window, so that each search window of every cell under consideration is included inside the first FFT window (40). Since one OFDM symbol corresponds to a delay equivalent to 20 km, such a configuration having multiple search windows inside two consecutive OFDM symbols should be typical in most network deployments.

The front-end FFT (10, 12) are common but then the outputs are treated differently for different eNodeBs to measure. For each eNodeB, the processing is the same for both FFT windows (40, 41) of a given OFDM symbol: the UE collects the resource elements corresponding to the PRS positions of this symbol, and multiplies term by term by the corresponding pilots conjugates to remove their contribution. The tones on non-pilot positions are filled with zeros.

Coherent Combining Across FFT Windows (16)

The following describes how to combine coherently (16) across FFT windows 40, 41. The description below (illustrated in FIG. 5) is derived for a single tap channel with a delay τ 50 for simplicity, but extension to a multipath fading channel is straightforward. The signal received by the UE is represented by CP 51 and data payload 52.

Using the classical tapped delay line model, the received signal can be written as the linear combination of delayed replicas weighted by complex fadings as would be understood. Since all operations involved in the disclosed methods are linear, we can describe them using a single replica, and the resulting signal with multiple replicas is just the sum of each path's contribution.

There are the following relations between the delays τ and $\tau_2$ (shown in FIG. 5) measured with respect to the first and second FFT window start, respectively:

$$\tau_2 = NT_s + \Delta W - \tau$$

where

N=2048,

Ts is the basic time unit of LTE standards as would be understood, and

ΔW is the delay between both FFT windows (this may be equal to CP length if we want to reuse the same hardware (UE) as used for PDSCH processing, but preferably ΔW=0). In the case where the FFT windows overlap, ΔW is negative.

Due to wrapping, only modulo FFT window length can be measured, so that the measured timing on second OFDM symbol is $\tau_2 = \Delta W - \hat{\tau}$. Since a delay in time corresponds to rotating exponential in frequency, the signal of both FFT windows can be made in phase (for coherent combination) by an appropriate rotation as explained below.

Let us denote:

X(n) the complex value that would be obtained by processing the resource element n without any delay (i.e. if the relevant FFT window was synchronized with the start of the measured symbol), and $X_1(n)$ and $X_2(n)$ the corresponding values we have on $1^{st}$ FFT window (40 from FIG. 4) and $2^{nd}$ FFT window (41 from FIG. 4), respectively.

We can prove by some algebraic manipulations that we have:

$$X_1(n) = \lambda_1(\tau) X(n) \exp\left(-2j\pi \frac{\tau}{N} n\right) + I_1(n)$$

where $$\lambda_1(\tau) = \left(1 - \frac{\tau - CP}{N}\right) \text{ if } \tau > CP,$$

and $\lambda_1(\tau)=1$ if $\tau \leq CP$ and $I_1(n)$ is the inter-carrier interference.

$$X_2(n) = \lambda_2(\tau) X(n) \exp\left(-2j\pi \frac{(\tau - \Delta W)}{N} n\right) + I_2(n)$$

where $$\lambda_2(\tau) = \left(\frac{\tau - \Delta W}{N}\right) \text{ if } \tau > \Delta W,$$

and $\lambda_2(\tau)=0$ otherwise, and $I_2(n)$ is the inter-carrier interference.

The self-interference terms $I_1(n)$ and $I_2(n)$ can be shown to be negligible compared to the useful terms containing the X(n) contribution and they are dominated by noise and inter-cell interference in the range of signal to interference plus noise ratios (SINRs) seen in real world networks for non-serving cells (typically lower than −6 dB) so that they will be ignored in the rest of the description below.

It is noted that whenever the inter-carrier interference becomes dominant compared to noise and inter-cell interference, the detection becomes simpler and the performance degradation as described below is not visible.

Therefore, we can combine coherently both observations $X_1(n)$ and $X_2(n)$ if we de-rotate $X_2(n)$ with a multiplication by $$\exp\left(-2j\pi \frac{\Delta W}{N} n\right).$$

If equal gain combining is used, $$X_C(n) = X_1(n) + \exp\left(-2j\pi \frac{\Delta W}{N} n\right) X_2(n) = (\lambda_1(\tau) + \lambda_2(\tau)) \exp\left(-2j\pi \frac{\tau}{N} n\right) X(n)$$

Assuming τ>max(ΔW,CP), we have $$X_C(n) = X_1(n) + \exp\left(-2j\pi \frac{\Delta W}{N} n\right) X_2(n) = \left(1 + \frac{CP - \Delta W}{N}\right) \exp\left(-2j\pi \frac{\tau}{N} n\right) X(n)$$

The quantity $$\exp\left(-2j\pi \frac{\tau}{N} n\right) X(n)$$

corresponds to the signal we would have collected with one FFT window and a delay smaller than CP for which we know the classical frequency domain implementation of timing estimation (using FFT, point by point multiplication with pilot sequence, and iFFT) is possible. Thus, we have a known problem with a solution which may comprise, for example, doing iFFT, accumulating over the different symbols of the PRS occasion, and taking the power to get a power delay profile.

Equal gain combining as shown above is only one example, and other types of combining may also be used. A more efficient combination method is the well-known maximum ratio combining where each contribution is weighted by a coefficient depending on its SNR prior to combination. The SNRs of both FFT windows contributions are not known here but in the case where the RSTD-Uncertainty is small compared to the OFDM symbol length, we can estimate them in certain simple cases based on the expressions of $X_1(n)$ and $X_2(n)$ given above, the SNRs on both FFT windows (40, 41) depend on the overlap between the received signal and each FFT window. This overlap can be roughly evaluated if the relevant RSTD-Uncertainty (44) is small compared to the OFDM symbol length. Then, weighted gain combining may be used instead of equal gain combining to improve performance. More details on the performance and implementation of weighted gain combining is given below.

Performance Considerations

The performance loss of the disclosed methods with respect to optimal processing may be assessed. To evaluate the SNR of the peak after time domain correlation, we can use the classical correspondence between time and frequency implementations for a signal arriving with a delay lower than the cyclic prefix. In this case, it is well known that time domain correlation is equivalent to the frequency domain implementation: FFT+multiplication with pilot conjugate+iFFT. Therefore, we only have to assess the loss of the disclosed implementation with respect to the frequency-domain implementation with a delay smaller than the CP.

The frequency-domain observation in the nominal case (delay smaller than the CP) can be written for a tone index n as $$Y(n) = \exp\left(-2j\pi \frac{\tau}{N} n\right) X(n) + w(n)$$

where $w(n)$ is an additive white Gaussian noise (AWGN) sample with power $\sigma^2$,
$X(n)$ is the transmitted pilot symbol, and
$\tau < CP$ is the delay.

The SNR in the frequency domain is $$SNR_{Ref} = \frac{E(|X(n)|^2)}{\sigma^2}.$$

The frequency-domain observation for the proposed method after combination is $$Y(n) = \left(1 + \frac{CP - \Delta W}{N}\right) \exp\left(-2j\pi \frac{\tau}{N} n\right) X(n) + w_1(n) + w_2(n)$$

where $w_1(n)$ and $w_2(n)$ are noise samples for the two consecutive FFT windows (40, 41).

The corresponding SNR is $$SNR_C = \frac{E(|X(n)|^2)}{2\sigma^2} \left|1 + \frac{CP - \Delta W}{N}\right|^2 = \frac{\left|1 + \frac{CP - \Delta W}{N}\right|^2}{2} SNR_{Ref}$$

Therefore, the loss compared to the optimal implementation is equal to $$-3.01 + 20\log_{10}\left(\left|1 + \frac{CP - \Delta W}{N}\right|\right).$$

Notice that for $\Delta W < 0$ the computations above are not strictly exact since the noise samples $w_1(n)$ and $w_2(n)$ are correlated so $E(|w_1(n) + w_2(n)|^2) \geq 2\sigma^2$.

If we take the case of $\Delta W = 0$, the loss becomes $$-3.01 + 20\log_{10}\left(\left|1 + \frac{CP}{N}\right|\right).$$

Using CP=144 and N=2048, we get a loss of $$-3.01 + 20\log_{10}\left(\left|1 + \frac{CP}{N}\right|\right) = 2.42 \text{ dB}.$$

This loss corresponds to a loss of peak SNR compared to state of the art time domain correlation. Actually, after correlation (either using a time domain or frequency domain approach) the resulting signal before delay estimation can be viewed as a noise floor together with a set of peaks corresponding to the signal we want to detect. The loss as computed above corresponds to the SNR reduction of a signal's peak compared to the time domain method.

Reducing the Performance Gap Using Weighted Gain Combining

The performance gap (reduced SNR) may be reduced by the usage of weighted gain combining instead of equal gain combining. The performance of the weighted gain combining compared to equal gain combining and time-domain correlation is presented before describing implementation options.

Theoretical Gain of Weighted Gain Combining

Neglecting the inter-carrier interference, the signals desired to be combined are:

$$X_1(n) = \lambda_1(\tau) X(n) \exp\left(-2j\pi \frac{\tau}{N} n\right) + w_1(n),$$

$$X_2(n) = \lambda_2(\tau) X(n) \exp\left(-2j\pi \frac{(\tau - \Delta W)}{N} n\right) + w_2(n)$$

where $w_1(n)$ and $w_2(n)$ are AWGN samples with same average powers.

Using optimal weighted gain combining (i.e. maximum ratio combining), one can obtain:

$$X_{MRC}(n) = \lambda_1(\tau) X_1(n) + \lambda_2(\tau) \exp\left(-2j\pi \frac{\Delta W}{N} n\right) X_2(n)$$

$$X_{MRC}(n) = $$
$$((\lambda_1(\tau))^2 + (\lambda_2(\tau))^2) \exp\left(-2j\pi \frac{\tau}{N} n\right) X(n) + (\lambda_1(\tau) w_1(n) + \lambda_2(\tau) w_2(n))$$

The SNR after combination is:

$$SNR_{MRC} = ((\lambda_1(\tau))^2 + (\lambda_2(\tau))^2)^2 \frac{E(|X(n)|^2)}{\sigma^2((\lambda_1(\tau))^2 + (\lambda_2(\tau))^2)} =$$
$$((\lambda_1(\tau))^2 + (\lambda_2(\tau))^2) SNR_{Ref}$$

Figure 6:
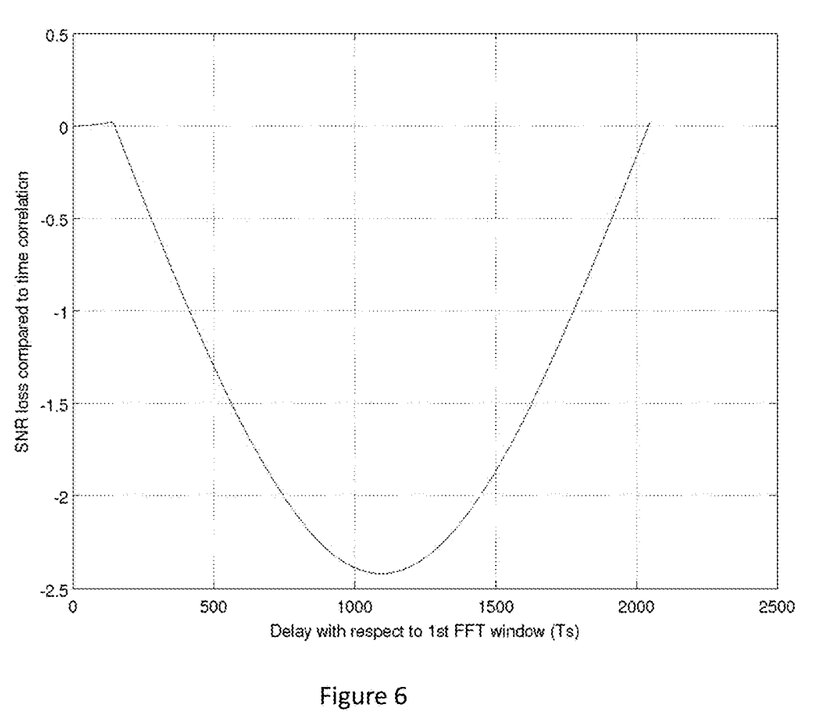
FIG. 6 illustrates maximum SNR loss compared to time-domain correlation against delay in relation to a 1st FFT window.

FIG. 6 (obtained with $\Delta W = 0$), shows the SNR loss of weighted gain combining compared to the SNR $$SNR_{Ref} = \frac{E(|X(n)|^2)}{\sigma^2}$$

in the frequency domain, which will thus be the loss compared to the time-domain implementation.

The loss of 2.4 dB is only visible if we have a half-half overlap (1024 Ts) between both FFT windows (40, 41). For partial overlap (small delays or delays close to an OFDM symbol), the loss can be very small as shown.

A variant of the proposed method can thus comprise using one pair of FFT windows (40, 41) per measured Cell instead of a common pair (meaning that in FIG. 4, we have one FFT pair per search window 42 instead of a common pair for multiple eNodeBs) and choosing the start of the first FFT window at ExpectedRSTD-RSTDUncertainty. This would reduce the performance loss as shown in FIG. 5 at the price of an increase of complexity since we would increase the number of front-end FFTs (10, 12).

Implementation of Weighted Gain Combining

The weighted gain combining implementation requires some a priori knowledge of the timing in order to find sufficiently accurate weights to use. However, as shown in the SNR loss curve of FIG. 6, only a rough value of the timing is sufficient as the loss slowly varies as a function of the timing (a granularity of e.g. 300 Ts is sufficient).

Therefore, RSTD-uncertainty is small enough (around the 5 µs, which is the case for e.g. 3GPP test cases), weighted gain combining may be applied and the loss in performance can be reduced compared to time-domain correlation.

In the case where the RSTD-uncertainty is significantly higher than 5 µs, weighted gain combining combination may be applied in the time domain. This is possible since all the operations involved in the proposed method are linear as would be understood.

Assuming that the noise powers on the different FFT windows (40, 41) are approximately equal, the relative difference in peaks in time domain directly provides the information on the relative difference in SNRs of both observations to combine. We can thus weight each iFFT output by the amplitude of its max value, and perform coherent combining before taking the power of the output.

In an embodiment equal gain combining is first used, then a maximum tap search is performed (or search for the window with the maximum power) to have a rough timing estimate, and use this to perform weighted gain combining before the final timing detection. Actually, as already seen on equations of $X_1(n)$ and $X_2(n)$, the values of $\lambda_1(n)$ and $\lambda_2(n)$ are necessary to perform MRC, and these values can be approximated if we have a rough timing estimate.

Algorithm Tuning

Enhancement of the disclosed method may include:

Conditional Application of Combining Based on a Priori Information

In the case where we have small enough RSTD-uncertainty (RSTD-uncertainty<<FFT window size), we can evaluate whether we should do coherent combining or not by comparing the performance loss of using coherent combining with the performance loss of using a single FFT window and no combining.

The SNR in frequency domain using combining is $$SNR_C = \frac{\left|1 + \frac{CP - \Delta W}{N}\right|^2}{2} SNR_{Ref}$$

whereas the SNR using a single window is $$SNR_C = \left|1 - \frac{\tau - CP}{N}\right|^2 SNR_{Ref}.$$

Therefore, if RSTD-uncertainty<<FFT window, we can use τ≈Expected−RSTD and chose to apply combining only if $$2 \times \left|1 - \frac{\tau - CP}{N}\right|^2 < \left|1 + \frac{CP - \Delta W}{N}\right|^2.$$

For example, for ΔW=0, we chose to apply combining only if $$ExpectedRSTD > \left(1 - \frac{1}{\sqrt{2}}\right)(N + CP) \approx 642 T_s.$$

A more conservative approach for the threshold for deciding whether combining is used could make use of both Expected-RSTD and RSTD-uncertainty, and apply combination only if the gain is ensured, i.e. only if $$ExpectedRSTD - RSTDUncertainty > \left(1 - \frac{1}{\sqrt{2}}\right)(N + CP).$$

FFT Window Selection

If necessary (e.g. if the time region spread by the different values of Expected-RSTD and RSTD-Uncertainty for different cells is large), the measured Cells can be grouped in groups having the same order of magnitude of Expected-RSTD, and the method applied to different pairs of FFT windows in parallel.

Performance Vs. Complexity Trade-Off

For a given chosen implementation with corresponding performance loss compared to the optimal time domain implementation, the following processing may be added to mitigate the loss:

Option 1: accept the degradation and mitigate by adding e.g. averaging across measures on consecutive PRS occasions. Here we take advantage of the fact that complexity reduction permits to afford doing the estimation per PRS occasion for every eNodeB.

Option 2: After the first application of the method (i.e. on first PRS occasion), one can add an SNR measure on the power delay profile of each measured Cell and decide whether we can afford the performance loss. This SNR may comprise measuring the power of the first path and comparing it to the noise floor. If there is a margin considered acceptable, the frequency domain implementation is used, and the performance degradation is accepted. If the margin is not high enough, a time domain implementation is used on the next occasion.

The benefits of the method mostly comprise the complexity reduction provided compared to the time-domain correlation. To strengthen this observation, it is recalled that the introduction of the CP in LTE in spite of the generated overhead was mainly motivated by the possibility to process all data in the frequency domain. Thus, this method, permitting to replace time-domain correlation by frequency-domain operations follows the same logic and is of high interest for the design of low complexity solutions.

Moreover, it has been shown that the proposed method is highly configurable with different upgrades and differing performance vs. complexity tradeoff.

For a given number of eNodeB to be measured equal to $N_{Cell}$, the number of operations to obtain a single sample of the time-domain correlation (i.e. one PDP sample) per OFDM symbol processing is $N_{Cell}N^2$.

For the frequency-domain implementation, the FFT complexity is $O(N \log_2 (N))$ to provide N samples. Let us denote $\alpha N \log_2 (N)$ the complexity of one FFT (the value of $\alpha$ depending on the actual implementation chosen for the FFT). To measure the $N_{Cell}$ eNodeBs, we have 2 common FFT then one iFFT per Cell. We also need to add the pilot compensation per Cell. Denoting $N_{PRB}$ the number of PRB (physical resource blocks) used for PRS, this results in $2N_{PRB}$ complex multiplications. In total, for one OFDM symbol, this becomes $$(N_{Cell} + 2)\alpha\log_2(N) + 2N_{Cell}\frac{N_{PRB}}{N}$$

operations per PDP sample.

In comparison to $N_{Cell}N^2$, typically, there may be, for 20 MHz bandwidth. N=2048, $N_{Cell}$=16, $N_{PRB}$=100, and considering $\alpha$=1, using $$(N_{Cell} + 2)\alpha\log_2(N) + 2N_{Cell}\frac{N_{PRB}}{N}$$

there are around 200 operations per sample for the frequency domain approach of the disclosed methods against $N_{Cell}N^2$=67108864 operations per sample for the known time domain approach, meaning 335000 more operations per sample in the time domain. This is a clear benefit of the disclosed methods.

In general, having a less complex algorithm enables a reduction in power consumption and a reduction in processor cycles which frees up the processor to perform other operations.

The various embodiments described above may be implemented by a computer program product. The computer program product may include computer code arranged to instruct a computer (processor) to perform the functions of one or more of the various methods described above. The computer program and/or the code for performing such embodiments may be provided to an apparatus, such as a computer (processor), on a computer readable medium or computer program product. The computer readable medium may be transitory or non-transitory. The computer readable medium could be, for example, an electronic, magnetic, optical, electromagnetic, infrared, or semiconductor system, or a propagation medium for data transmission, for example for downloading the code over the Internet. Alternatively, the computer readable medium could take the form of a physical computer readable medium such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

An apparatus such as a computer (processor) may be configured in accordance with such code to perform one or more processes in accordance with the various embodiments discussed herein.

While this invention has been particularly shown and described with references to example embodiments thereof, it will be understood by those skilled in the art that various changes in form and details may be made therein without departing from the scope of the invention encompassed by the appended claims.

What is claimed is:

1. A computer implemented method for providing Observed Time-Difference of Arrival (OTDOA) timing information comprising:
    defining a Fast Fourier Transform (FFT) window pair for estimating a value of reference signal time difference (RSTD) for at least one base station and a reference cell;
    receiving a Positioning Reference Signal (PRS) from the at least one base station and the reference cell;
    executing an FFT per OFDM symbol of the PRS for each FFT window of the FFT window pair;
    obtaining a first FFT output vector per OFDM symbol of each FFT window;
    for each first output vector, descrambling tones corresponding to the known position of the PRS, wherein all other tones are set to zero;
    combining vectors based on respective first FFT output vectors;
    executing an inverse Fast Fourier Transform (iFFT) to convert to the time domain; and
    calculating an estimated value of RSTD for the at least one base station and the reference cell;
    the method further comprising attempting to find a single pair of FFT windows wherein the first FFT window spans search windows from the at least one base station and the reference cell to be measured, and when the single pair of FFT windows cannot be found that spans the search windows, using a plurality of FFT window pairs.

2. The method of claim 1 further comprising time domain accumulation or interpolation carried out per FFT window based on the first FFT output vectors to obtain a second output vector per FFT window; and wherein
    the combining is coherent combining carried out between the two second vectors to obtain an iFFT input; and executing the iFFT on the input.

3. The method of claim 1 further wherein the combining is coherent combining carried out between the first FFT output vector of each OFDM symbol of each FFT window to obtain a combined vector per OFDM symbol; and wherein
    time domain accumulation or interpolation is carried out over the combined vectors to obtain an iFFT input; and executing the iFFT on the input.

4. The method of claim 1 further comprising time domain accumulation or interpolation carried out per FFT window based on the first FFT output vectors to obtain a second output vector per FFT window;
    executing the iFFT on each second output vector to obtain respective power delay profiles; and wherein the combining is non-coherent combining carried out on the power delay profiles.

5. The method of claim 1 wherein defining an FFT window pair comprises arranging the FFT window pair based on pre-defined search window information from at least one of the at least one base station and the reference cell.

6. The method of claim 1 wherein the first FFT window of the FFT window pair is positioned such that it begins at the start of an earliest search window of the at least one base station or reference cell.

7. The method of claim 1 wherein an FFT window pair is defined for each of the reference cell and the at least one base station.

8. The method of claim 1 wherein the windows of an FFT window pair overlap.

9. The method of claim 1 wherein the windows of an FFT window pair are separated.

10. The method of claim 9 wherein the separation is by the length of the cyclic prefix.

11. The method of claim 5 wherein, together, the search windows of the at least one base station and the reference cell span a maximum of one OFDM symbol.

12. The method of claim 1 wherein the combining is carried out in the frequency domain.

13. The method of claim 1 further comprising executing a time domain implementation on a subsequent iteration of the method based on the SNR of the power delay profile of the at least one base station and the reference cell.

14. A system comprising a processor arranged to carry out the method according to claim 1.

15. A non-transitory computer readable medium comprising instructions that when executed by a processor cause the processor to carry out the method of claim 1.

* * * * *